United States Patent
Campagna et al.

(10) Patent No.: US 9,490,979 B2
(45) Date of Patent: Nov. 8, 2016

(54) SYSTEM AND METHOD FOR PROVIDING CREDENTIALS

(75) Inventors: Matthew John Campagna, Ridgefield, CT (US); Herbert Anthony Little, Waterloo (CA); Anthony Rosati, Ottawa (CA); Scott Alexander Vanstone, Campbellville (CA)

(73) Assignee: BlackBerry Limited, Waterloo, Ontario (CA)

( * ) Notice: Subject to any disclaimer, the term of this patent is extended or adjusted under 35 U.S.C. 154(b) by 800 days.

(21) Appl. No.: 12/878,145

(22) Filed: Sep. 9, 2010

(65) Prior Publication Data

US 2011/0145585 A1 Jun. 16, 2011

Related U.S. Application Data

(60) Provisional application No. 61/240,877, filed on Sep. 9, 2009.

(51) Int. Cl.
*H04L 9/32* (2006.01)
*H04L 9/30* (2006.01)

(52) U.S. Cl.
CPC ........... *H04L 9/3066* (2013.01); *H04L 9/3263* (2013.01)

(58) Field of Classification Search
CPC . H04L 9/3263; H04L 9/0861; H04L 63/023; H04L 2209/64; H04L 9/3066; G06Q 20/38215; G06Q 20/00
USPC ......................................................... 713/176
IPC .................................................... H04L 9/3263
See application file for complete search history.

(56) References Cited

U.S. PATENT DOCUMENTS

| | | | |
|---|---|---|---|
| 5,878,144 A | 3/1999 | Aucsmith et al. | |
| 6,615,347 B1 | 9/2003 | De Silva et al. | |
| 6,675,296 B1 * | 1/2004 | Boeyen et al. | 713/156 |
| 6,802,002 B1 * | 10/2004 | Corella | 713/175 |
| 7,509,489 B2 * | 3/2009 | Kostal et al. | 713/156 |
| 2002/0038420 A1 * | 3/2002 | Collins et al. | 713/156 |
| 2002/0147905 A1 * | 10/2002 | Perlman | 713/157 |
| 2002/0165912 A1 * | 11/2002 | Wenocur et al. | 709/203 |
| 2006/0206707 A1 | 9/2006 | Kostal et al. | |
| 2007/0094493 A1 * | 4/2007 | Ali et al. | 713/156 |
| 2010/0121928 A1 | 5/2010 | Leonard | |

OTHER PUBLICATIONS

Sec 4: Elliptic Curve Qu-Vanstone Implicit Certificate Scheme (ECQV), Oct. 17, 2008, Certicom Corp., pp. 1-18.*
Engel, Lawrence J.; International Search Report from corresponding PCT Application No. PCT/CA2010/001393; received by applicant Jan. 24, 2011.
European Search Report dated Jul. 1, 2011. In corresponding application No. 10176073.
Canadian Office Action dated Mar. 16, 2015, received for Canadian Application No. 2,772,136.

* cited by examiner

*Primary Examiner* — William Goodchild
(74) *Attorney, Agent, or Firm* — Thomas S. Grzesik; Fleit Gibbons Gutman Bongini & Bianco, P.L.

(57) ABSTRACT

A method and system is operable to provide credentials by generating a first credential that conforms to a first specified format. A second credential conforming to a second specified format is included in the first credential so that the second credential may be distributed through the cryptosystem using the first specified format. The credential may be a digital certificate.

18 Claims, 9 Drawing Sheets

Fig 4

| Header | Subject Identifier | Issuer Identifier | Policy Information | Public key reconstruction value |
|---|---|---|---|---|
| | | ID_A | | B_A |

$IC_A$ – implicit certificate

This is an example only, but mimics what is being used in the sample implicit certificate in the table.

Fig 3

Certificate

| Header | Certificate Information | | | | | | | Signature |
|---|---|---|---|---|---|---|---|---|
| | Serial Number | Issuer Identifier | Subject Identifier | Validity Dates | Public Key Information | Public Key | Policy Information | $IC_A$ – implicit certificate | t – server private key contribution | sig = Sign(Certificate info, Q_c) |

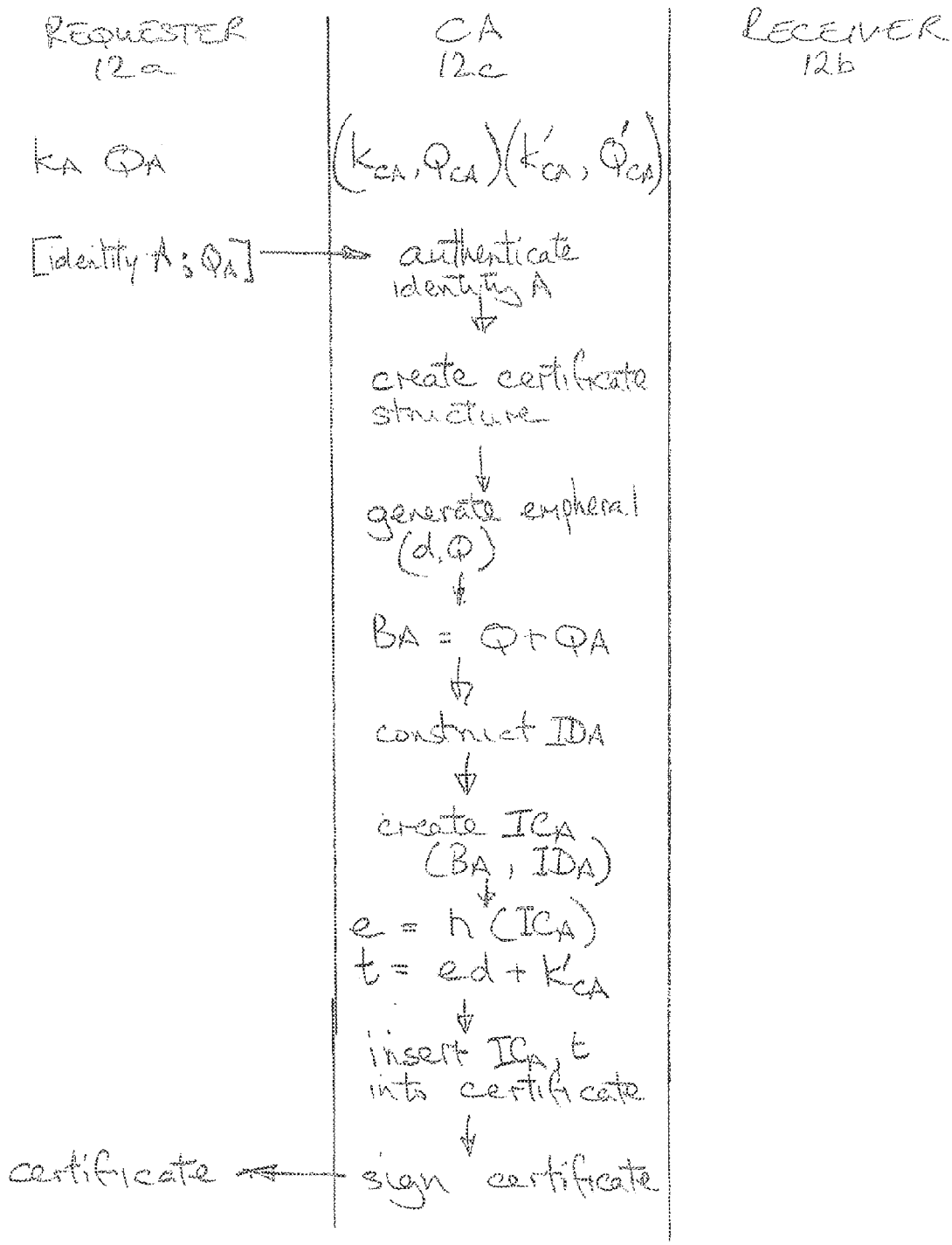

SYSTEM AND METHOD FOR PROVIDING CREDENTIALS

This application claims priority to U.S. Provisional Application No. 61/240,877 filed on Sep. 9, 2009, the contents of which are incorporated herein by reference.

TECHNICAL FIELD

The following relates to systems and methods for providing credentials.

BACKGROUND

Data communication networks are often used to transfer data between computing devices, for particular users or the devices themselves, either of which may be commonly referred to as correspondents or entities or both, and have become ubiquitous with modern commercial activities. Cryptographic systems may be deployed to achieve security goals such as confidentiality, data integrity, data origin authentication, entity authentication, and non repudiation.

Symmetric key cryptographic systems achieve these goals by sharing a common secret key between two correspondents.

Public key cryptography utilises a public/private key pair for each correspondent. The public key and private key are mathematically related such that computing the public key from the private key is relatively simple but recovery of the private key from the public key is considered computationally infeasible. The private key is maintained secret at all times but the public key is distributed or made available to other correspondents.

Public key cryptography enables a message from a sender to be encrypted using the public key of the intended recipient and further enables the message to be recovered by the recipient using the corresponding private key, which is known only to the recipient.

Messages may also be signed by the sender using the sender's private key and the signature may then be verified by a recipient using the sender's public key.

Many protocols have been developed to perform encryption, signing and key agreement using public key cryptography. It is however inherent in these protocols that the public key being used is in fact associated with the appropriate correspondent or entity and is not that of an interloper purporting to be that correspondent, referred to as entity authentication. In order to provide entity authentication, a hierarchy of trust may be established.

For example, a pair of correspondents who wish to correspond can rely upon a third party that they both trust. The third party, referred to as a certificate authority (CA) may be, for example, a bank, a service provider, or a manufacturer to name a few. The CA has a public/private key pair and the CA's public key is available to and trusted by each of the entities. The CA public key may be, for example, embedded in the correspondent's computing device at manufacture or sale and is used to verify the signatures on messages sent from the CA to one or both of the correspondents.

When one correspondent wishes to distribute her public key to other entities, she may ask the CA to sign a message containing her public key, which confirms that the public key belongs to her. The message and the signature may then be sent to the other entity who uses the CA's public key to verify the signature and thereafter use the sender's public key with confidence.

The formatting of the message and signature is referred to collectively as a certificate that is issued by the CA. It will be appreciated that the hierarchy may extend through multiple tiers so that the CAs may themselves have a common trusted third party, and so on, back to a root. In this way, the trust may propagate through different layers of the PKI and facilitate the transfer of information throughout the network.

To provide interoperability over a wide network, it is desirable for the certificates to share a common format. The certificates typically comprise data strings and in order to be able to extract information from the string, the correspondent needs to know the format of the string. The format of the certificates may therefore be standardized or otherwise define a specific format, to allow each correspondent to utilize the certificates issued by the CA.

One standard for certificate formatting is ITU-T X.509 (hereinafter 'X.509' for brevity). These certificates are issued from a CA after processing a certificate request, such as a PKCS#10 certificate request file.

Alternative certificate formats may have particular characteristics, such as an ability to be used at a reduced bandwidth, making them particularly suitable for constrained environments such as wireless communications. For example, the Elliptic Curve Qu-Vanstone (ECQV) protocol offers a method for creating implicit certificates and therefore can offer significant bandwidth savings.

BRIEF DESCRIPTION OF THE DRAWINGS

Embodiments will now be described by way of example only with reference made to the accompanying drawings in which:

FIG. 3 is an example representation of a certificate exchanged between correspondents in the network of FIG. 2.

FIG. 4 is an example representation of supplementary information that is contained within the certificate of FIG. 3.

DETAILED DESCRIPTION OF THE DRAWINGS

The use of a particular cryptographic protocol typically requires a certificate request and the generation and provision of the certificate that conforms to a specified format for that protocol, or that conforms to a specification or standard related thereto, to be provided throughout the system incorporating the protocol, for example a PKI. Whilst this is technically feasible, it does require all levels of the trusted hierarchy to be able to process such requests and generate or otherwise provision such certificates. It has been recognized that this may be considered an unnecessary burden by some participants in the system, particularly where an alternative standard or specification is only considered for use in a specialized area or application and therefore implementation of the alternative standard or specification is hindered.

In general terms, the following provides a method of providing credentials by, for example, providing a certificate from a CA in response to a request according to a first specified format. In such examples, the certificate incorporates in the certificate structure or format, supplementary information to permit the requestor to create and use a certificate of a second, different specified format.

The certificate issued by the CA complies with the first specified format e.g. according to or derived from a particular standard, and therefore may be distributed through the system (e.g. PKI) in the normal manner.

The requestor who wishes to conduct an exchange of information using the second specified format, e.g. according to or derived from another standard, may extract the supplementary information from the certificate and utilize it to enable communication according to the second specified format.

The supplementary information in the embodiments described below includes the necessary information to transform the certificate from the first specified format to the second specified format. For example, this may include an implicit certificate and private key contribution data used by the requestor to construct a private key corresponding to a public key bound in the implicit certificate.

Figure 1:
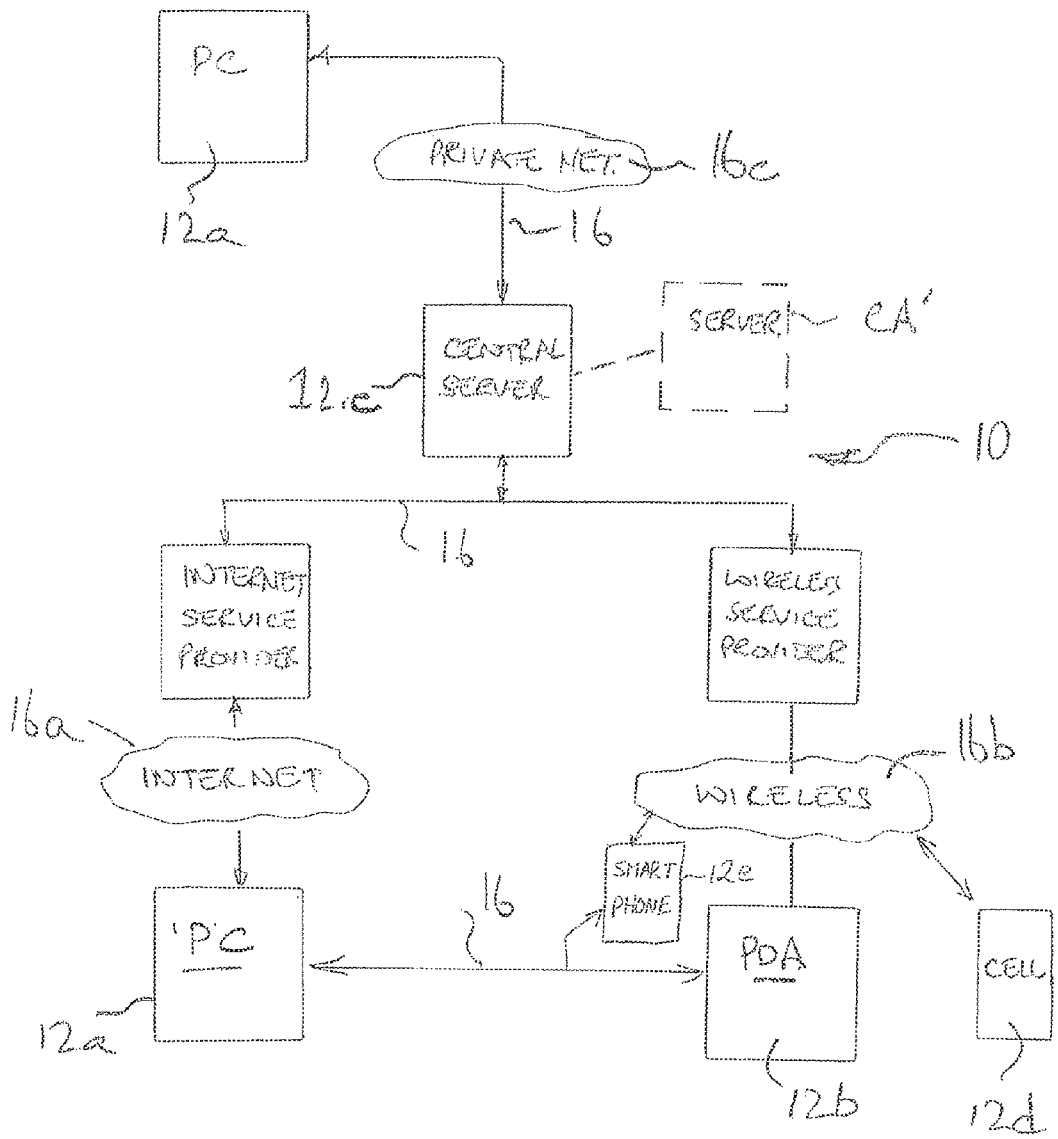
FIG. 1 is a schematic representation of a data communication network.

Referring therefore to FIG. 1, a data communication network 10 includes a plurality of correspondents 12. Each correspondent 12 is a computing device allowing an entity to access the network 10. The correspondents 12 may include a personal computer 12a, a personal digital assistant 12b, a server 12c, a cell phone 12d, or a smart phone 12e.

The correspondents 12 communicate through communication links 16 that may include the internet 16a, wireless network 16b, or a private network 16c; and employ addressing and routing protocols commonly used to control and direct the flow of information through the network.

Figure 2:
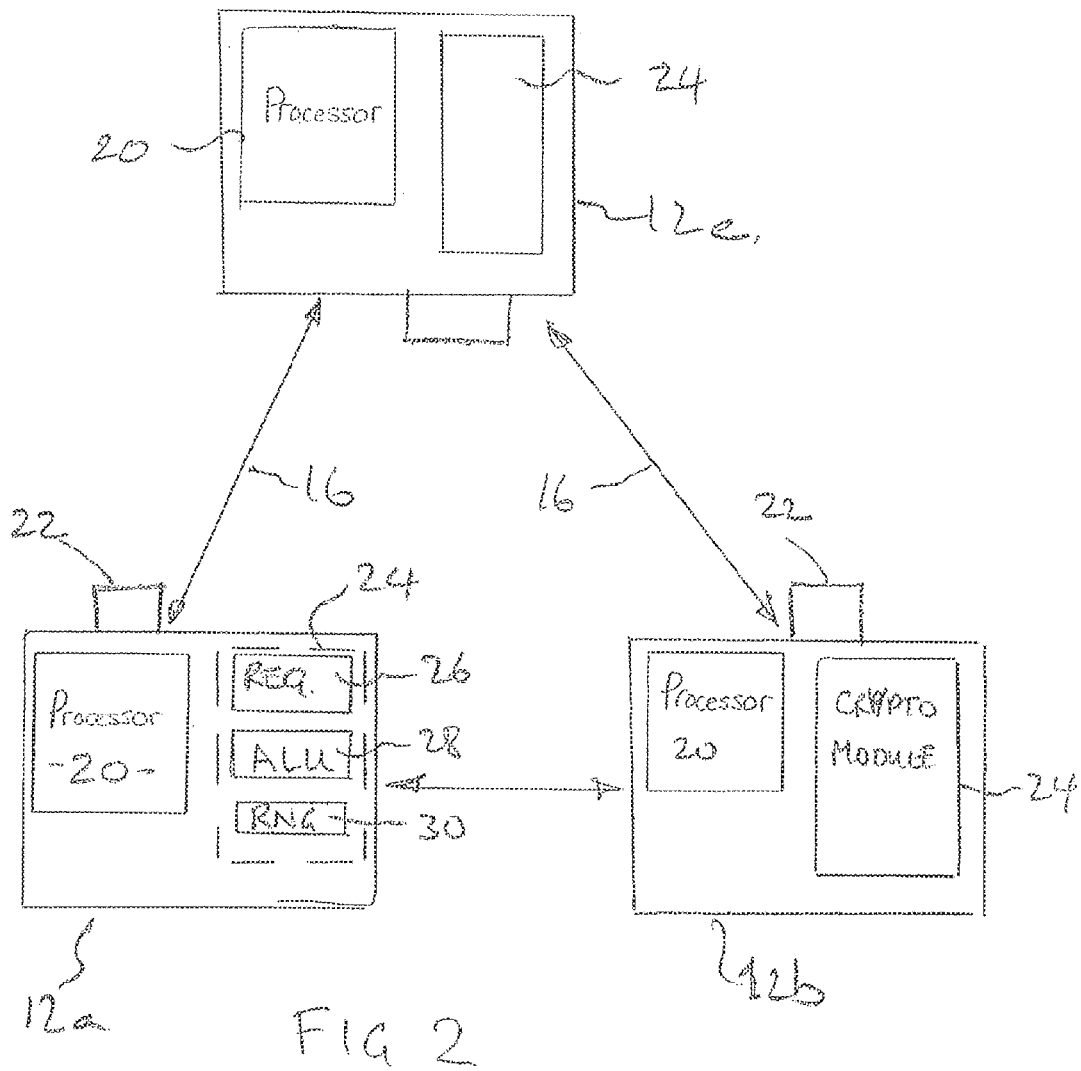
FIG. 2 is a schematic representation of a portion of the data communication network of FIG. 1.

As can best be seen in FIG. 2, each of the correspondents 12 includes a processor 20 and a communication port 22 for connection to respective communication links 16. The correspondents 12 may each include a cryptographic module 24 that has storage registers (REG) 26 to retain in a secure manner the system parameters and keys. The cryptographic module 24 will typically have a random number generator (RNG) 30, to generate ephemeral private keys and an arithmetic logic unit (ALU) 28 to perform mathematic operations required to implement cryptographic protocols implemented by the processor 20.

It will be appreciated that the cryptographic module 24 may be incorporated within the processor 20 so as to be physically coextensive but functionally it provides a distinct secure environment to perform cryptographic operations. In embodiments, the processor 20 may itself perform the operations of the cryptographic module 24.

It will be appreciated that the cryptographic modules 24 and processors 20 exemplified herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by cryptographic module 24 or processor 20 or both. Any such computer storage media may be part of the respective correspondent 12 or accessible or connectable thereto.

The correspondents 12 may be arranged in a hierarchy of trust and in the embodiment shown, the server 12c includes a cryptographic module 24 that functions as a certificate authority, CA. The correspondents 12 that trust the CA may have the public key of the CA embedded in the registers 26 to establish the trusted relationship. The correspondents 12 can communicate through the data links 16 and the processor 20 may call upon the cryptographic module 24 to perform cryptographic functions such as signing messages, verifying signatures and encrypting messages in accordance with the protocols selected by the processor.

Each of the cryptographic modules 24 stores the parameters for the cryptographic system to be implemented. In embodiments, the correspondents utilize an elliptic curve cryptosystem (ECC) that utilizes the intractability of the discrete log problem in an elliptic curve group defined over a finite field. The elliptic curve group comprises the points that have elements of the underlying field as coordinates and that satisfy the equation of the elliptic curve. In a typical application, the field Fp is the field of integers modulo p and the elliptic curve E is defined by an equation of the form $y^2 = x^3 + ax + b$, where a, b, $\in$ Fp. A pair (x,y), where x, y$\in$Fp, is a point on the curve if values (x,y) satisfy the equation of the curve.

The parameters of the cryptosystem stored in the registers 26 include the values of α, b to define the curve being utilized; a base point P, that is a generator of the points forming the elliptic curve group; and the order, n, of the point P.

A private key, k, is an integer generated at random and lying in the interval [1, n−1], and the corresponding public key Q is obtained by a k-fold group operation on P. As the elliptic curve group uses additive notation, the corresponding public key Q=kP. The establishment of an elliptic curve cryptosystem is well known and is more fully described in the Guide to Elliptic Curve Cryptography by Hankerson et al., available from Springer under ISBN 0-387-95273-X, the contents of which are incorporated by reference.

In the example shown, each of the correspondents 12 has a key pair k, Q which may be considered long term or static key pairs. An ephemeral or short term key pair k', Q' may also be generated by the cryptographic module 24 using the RNG 30 to obtain the short term private key k' and the ALU 28 to compute the short term public key Q'.

In order for the correspondent 12a to communicate with correspondent 12b over links 16, the correspondent 12a needs to provide its public key $Q_A$. To authenticate the correspondent 12a to correspondent 12b, the public key $Q_A$ is included in a certificate 40 that is signed by the CA, 12c. The certificate 40 is sent to the correspondent 12b who uses the public key of the CA embedded in the registers 26 to verify the signature on the certificate 40. The public key $Q_A$ may then be extracted from the certificate 40 and used with confidence.

A format of a certificate 40 (e.g. the structure of a certificate 40) that is compatible with the X.509 certificate formatting standard is shown in FIG. 3. It can be appreciated that the principles herein may also be applied to other certificate formats, such as those utilizing type/length/value or fixed-field formats, etc. The certificate 40 comprises a collection of data referred to as the certificate information 42 and a signature 44. The certificate information 42 includes a header 46, a serial number 48, an issue identifier 50, subject identifier 52, validity dates 54 indicating the period of validity of the certificate 40, public key information 56, the public key $Q_A$, and policy information 60.

A pair of extension frames 62, 64 are incorporated into the certificate 40 to include supplementary information in the form of a certificate for use with a second standardized/specified protocol. In the example embodiment disclosed in FIG. 3, the supplementary information is an implicit certificate $IC_A$ formatted for use with the ECQV protocol and the private key contribution data, t, as more fully described below. The ECQV protocol is documented in the SECG SEC 4 standard.

The certificate information 42 is exemplarily signed using an ECDSA signature protocol (ANSI X9.62 standard) and the signature components, (r,s) appended to the certificate information 42 as the signature 44. An example specification of the certificate 40 is as follows.

| Bytes | Description | Value |
|---|---|---|
| 30 | Octet String | |
| 82 | Length of length | 2 bytes |
| 03 62 | Length | 866 bytes |
| 30 | Octet String | |
| 82 | Length of length | 2 bytes |
| 02 FC | Length | 764 bytes |
| A0 | Certificate Information | |
| 03 02 01 02 | Certificate Version 3 | |
| 02 | Integer | |
| 08 | Length | 8 bytes |
| 76 A2 9E 8A 17 67 A5 34 | Certificate Serial Number | 76 A2 9E 8A 17 67 A5 34 |
| 30 | Octet String | |
| 16 | Length | 16 bytes |
| 06 | Object Identified | |
| 07 | Length | 7 bytes |
| 07 2A 86 48 CE 3D 04 03 | Signature Algorithm | ecdsa_with_specified |
| 30 | Octet String | |
| 0B | Length | 11 bytes |
| 06 | OID | |
| 09 | Length | 9 bytes |
| 09 60 86 48 01 65 03 04 02 01 | Hashing Algorithm | sha256 |
| 30 | Octet String | |
| 81 | Length of length | 1 byte |
| 8E | Length | 142 bytes |
| 31 0B 30 09 06 03 55 04 06 0C 02 55 53 31 33 30 31 06 03 55 04 0A 0C 2A 53 74 61 6E 64 61 72 64 73 20 66 6F 72 20 45 66 66 69 63 69 65 6E 74 20 43 72 79 70 74 6F 67 72 61 70 68 79 20 47 72 6F 75 70 31 2E 30 2C 06 03 55 04 0B 0C 25 4E 6F 20 4C 69 61 62 69 6C 69 74 79 20 2D 20 46 6F 72 20 54 65 73 74 20 50 75 72 70 6F 73 65 73 20 4F 6E 6C 79 31 1A 30 18 06 03 55 04 03 0C 11 53 45 43 47 20 46 72 65 65 20 54 65 73 74 20 43 41 | Issuer | Issuer: C = U.S., O = Standards for Efficient Cryptography Group, OU = No Liability-For Test Purposes Only, CN = SECG Free Test CA |
| 30 | Octet String | |
| 1E | Length | 30 bytes |
| 17 0D 30 38 30 32 30 34 31 35 35 33 33 35 5A 17 0D 30 39 30 32 30 34 31 35 35 33 33 35 5A | Key Validity Dates | Not Before: Feb. 4 15:53:35 2008 GMT Not After: Feb. 4 15:53:35 2009 GMT |
| 30 | Octet String | |
| 64 | Length | 100 bytes |
| 31 1E 30 1C 06 03 55 04 03 0C 15 61 78 30 39 5F 30 30 31 68 40 68 6F 74 6D 61 69 6C 2E 63 6F 6D 31 12 30 10 06 03 55 04 03 0C 09 61 78 30 39 5F 30 30 31 68 31 2E 30 2C 06 03 55 04 0B 0C 25 4E 6F 20 4C 69 61 62 69 6C 69 74 79 20 2D 20 46 6F 72 20 54 65 73 74 20 50 75 72 70 6F 73 65 73 20 4F 6E | Subject | Subject: CN = ax09_001h@hotmail.com, CN = ax09_001h, OU = No Liability-For Test Purposes Only |

-continued

| Bytes | Description | Value |
|---|---|---|
| 6C 79 | | |
| 30 | Octet String | |
| 13 | Length | 19 bytes |
| 06 07 2A 86 48 CE 3D 02 01 06 08 2A 86 48 CE 3D 03 01 07 | Public Key | elliptic_curve_public_key secp256r1_curve |
| 30 | Octet String | |
| 42 | Length | 66 bytes |
| 04 1F C5 1A 41 FE E0 CF 1D C9 EA 4B 95 4A EC AD 19 9F 2C 58 DE 1B 10 85 8A 1E 58 5C 36 E9 E2 58 E6 0E 53 88 74 B0 FF 8E B7 FA C2 EC 71 3F 65 80 FE 66 1A CE 2E 92 53 9C 19 E6 3A 8C 6B 57 39 71 AA | Public Key | Uncompressed public key |
| A3 | Certificate Information | |
| 81 | Length of length | 1 byte |
| ED | Length | 237 bytes |
| 30 | Octet String/Sequence | |
| 81 | Length of length | 1 byte |
| EA | Length | 234 bytes |
| 30 | Octet String/Sequence | |
| 0F | Length | 15 bytes |
| 06 03 55 1D 13 | Basic Constraint | |
| 01 01 FF | Critical | False |
| 04 05 30 03 01 01 00 | Key Usage | Data encipherment |
| 30 | Octet String/Sequence | |
| 16 | Length | 22 bytes |
| 06 03 55 1D 25 | Extended Key Usage | |
| 01 01 FF | Critical | False |
| 04 0C 30 0A 06 08 2B 06 01 05 05 07 03 04 | Key Usage | Email Protection |
| 30 | Octet String/Sequence | |
| 4B | Length | 75 bytes |
| 06 03 55 1D 1F 04 44 30 42 30 40 A0 3E A0 3C 86 3A 68 74 74 70 3A 2F 2F 77 77 77 2E 73 65 63 67 74 65 73 74 63 61 2E 70 62 69 72 65 73 65 61 72 63 68 2E 63 6F 6D 2F 63 72 6C 2F 73 65 63 67 2E 74 65 73 74 2E 63 61 2E 63 72 6C | CRL Distribution Point | X509v3 CRL Distribution Points: URI:http://www.secgtestca.pbiresearch.com/crl/secg.test.ca.crl |
| 30 | Octet String/Sequence | |
| 62 | Length | 98 bytes |
| 06 03 55 1D 20 04 5B 30 59 30 57 06 07 2B 81 04 07 00 00 00 30 4C 30 4A 06 08 2B 06 01 05 05 07 02 01 16 3E 68 74 74 70 3A 2F 2F 77 77 77 2E 73 65 63 67 74 65 73 74 63 61 2E 70 62 69 72 65 73 65 61 72 63 68 2E 63 6F 6D 2F 63 61 2F 73 65 63 67 | Policy | Policy: 1.3.132.7.0.0.0 CPS: http://www.secgtestca.pbiresearch.com/ca/secg.test.ca.pol.html |
| 30 | Octet String/Sequence | |
| 71 | Length | 113 bytes |
| 30 44 06 XX XX XX XX XX XX 03 3B 00 22 08 00 00 00 00 05 54 45 53 54 53 45 43 41 01 09 00 0f 00 00 00 00 03 1f 64 a6 e3 6a 4c 84 62 d0 82 08 e9 72 fe 15 08 38 12 8e 28 65 b8 7d d7 b5 d9 76 f3 39 6c e9 6d | ECQV Certificate | Implicit certificate: 00 22 08 00 00 00 00 05 54 45 53 54 53 45 43 41 01 09 00 0f 00 00 00 00 00 00 03 1f 64 a6 e3 6a 4c 84 62 d0 82 08 e9 72 fe 15 08 38 12 8e 28 65 b8 7d d7 b5 d9 76 f3 39 6c e9 6d XX XX XX XX XX represents an OID to be defined |
| 30 29 06 05 XX XX XX XX XX 03 20 CA F5 F6 87 97 10 5A 28 D2 28 3A 12 1D 8C 52 85 B2 41 23 DB 94 E8 B6 75 BE 84 01 4A 29 63 | Private Key Contribution Value, t. | Server contribution value: CA F5 F6 87 97 10 5A 28 D2 28 3A 12 1D 8C 52 85 B2 41 23 DB 94 E8 B6 75 BE 84 01 4A 29 63 72 CB, XX XX XX XX XX represents an OID to be defined |

| Bytes | Description | Value |
| --- | --- | --- |
| 72 CB | | |
| ABOVE DATA IS | | |
| SIGNED | | |
| 30 | Octet String/Sequence | |
| 16 | Length | 22 bytes |
| 06 07 2A 86 48 CE 3D 04 | | ecdsa_with_specified |
| 03 30 0B 06 09 60 86 48 01 | | sha256 |
| 65 03 04 02 01 | | |
| 03 | Binary String | |
| 48 | Length | 72 bytes |
| 00 30 45 02 20 3B C0 62 | Signature | signature_value (r, s) |
| 56 DE 90 54 6C 23 72 EF | | (note-not valid just simulated signature) |
| 47 3B DA FA 61 CE 79 F8 | | |
| DA D2 85 E8 ED 66 87 8D | | |
| 3D 60 D7 CA D9 02 21 00 | | |
| 99 51 8E B6 AD 0D A9 31 | | |
| CE FF EE 05 FE 24 A0 59 | | |
| 22 1F 3F 38 D4 85 CE 5C | | |
| AS 5E 21 07 A7 7E EE 7A | | |

The certificate 40 in this example is compatible with the standardized X.509 certificate formatting and therefore widely accepted in the network, and the incorporation of the ECQV implicit certificate and private key contribution data, t, enables selective use of the second format used in a second protocol between correspondents 12.

Figure 5:
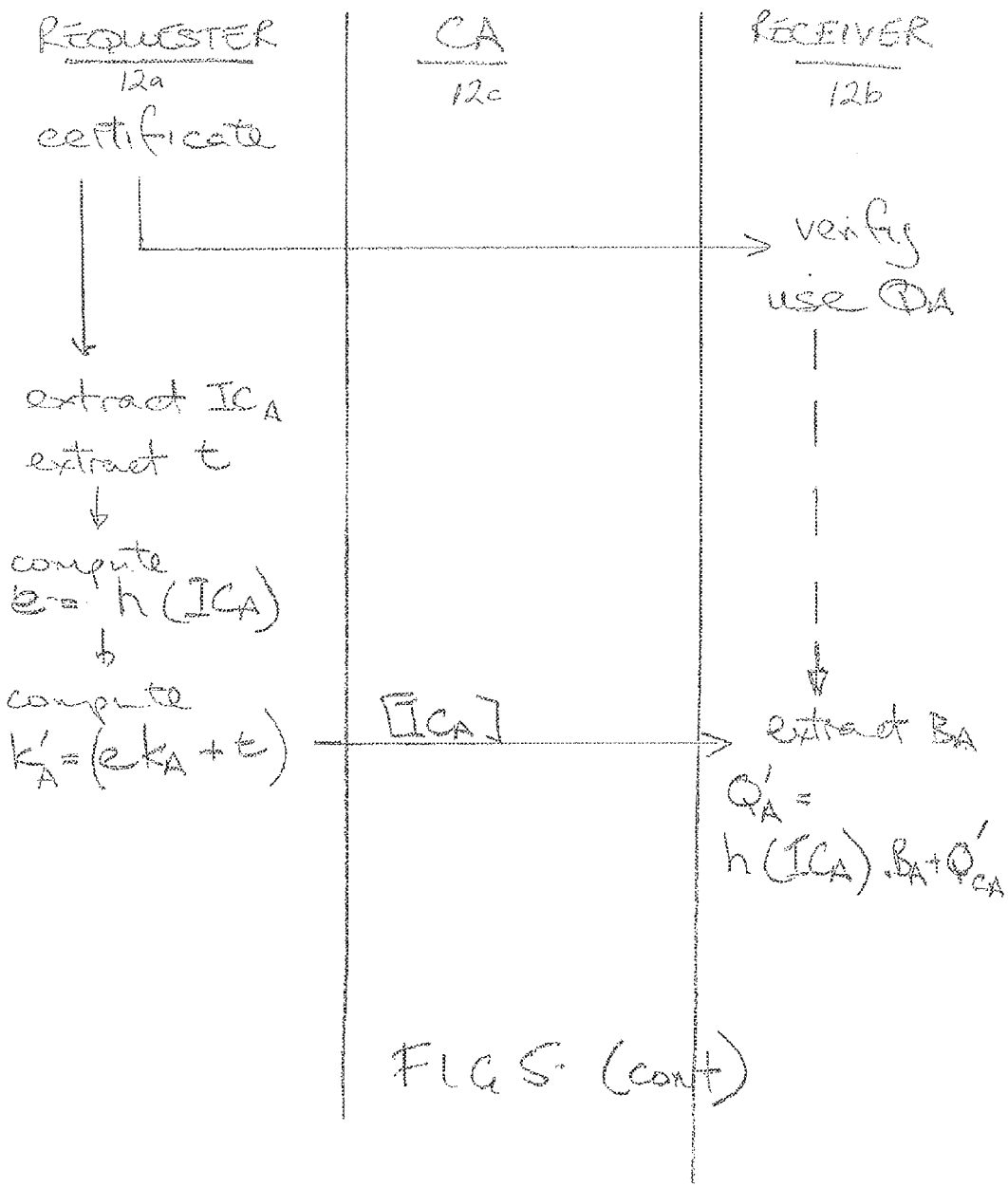
FIG. 5 is an example chart showing the passage of information between the correspondents in the network of FIG. 2.

The provisioning of the credentials, e.g. by way of certificates 40 to the correspondents 12, is shown in FIG. 5.

Correspondent 12a is directed to send a communication to correspondent 12b. Correspondent 12a has a static key pair $k_A$, $Q_A$. The communication is initiated by requesting a certificate 40 from the CA 12c for the public key $Q_A$, of correspondent 12a. The requestor, correspondent 12a, sends a request to the CA, 12c, in accordance with the requestor transformation of the first standardized protocol, in the present example, X.509.

The request includes identification information, indicated in FIG. 5 as identity A, key usage requests, and the public key $Q_A$. The request may be signed using the private key $k_A$.

The request is received by the CA, 12c, which verifies the contents of the request, including verification of any signature on the request. The CA, 12c validates the identification information according to the policies implemented by the CA, 12c, such as by a challenge/response exchange between the CA, 12c and the requestor 12a.

Upon validation of the identity, the CA formats the certificate structure using the information received from the requestor. Prior to signing the certificate 40, the CA also generates a certificate corresponding to the second protocol and inserts that into the extension fields. The CA, 12c has two static key pairs, ($k_{CA}$, $Q_{CA}$) and ($k'_{CA}$, $Q'_{CA}$) and uses one for the certificate of the first standardized protocol and the other for the second standardized protocol.

In embodiments in which the second format and second protocol is associated with ECQV, the CA generates an ephemeral key pair (d,Q) using the RNG 30 and ALU 28 of its cryptographic module 24.

The CA, 12c, computes a public key reconstruction value $B_A = Q + Q_A$ and constructs identity and validity information, denoted by $ID_A$. This information may be obtained from that previously constructed by the CA, 12c for use in the certificate information 42 if convenient.

The CA 12c then formats an ECQV certificate $IC_A$, to contain the values $B_A$ and $ID_A$. The format of the certificate $IC_A$ is shown in FIG. 4 and includes identity and validity information $ID_A$ indicated at 70 and public key reconstruction value BA 72. The identity and validity information $ID_A$ includes a header 74, subject identifier 76, issuer identifier 78 and policy information 80.

The certificate $IC_A$ is used to generate private key contribution data, t, by initially hashing the certificate $IC_A$ to obtain a hash value e, i.e., e=hash ($IC_A$).

The private key contribution data, t, is then generated using the hash value, e, the ephemeral private key d, and the CA's second static private key $k'_{CA}$ so that $t = ed + k'_{CA}$.

The certificate $IC_A$ and the private key contribution data, t, are inserted into the extension fields 62, 64 respectively of certificate 40 which, in this example, is then signed using the ECDSA signature protocol. A worker skilled in the art would appreciate that other signing protocols may be used instead of ECDSA for signing said certificate 40.

The ECDSA signature protocol uses the CA's primary key pair ($k_{CA}$, $Q_{CA}$) as long term keys and generates an additional ephemeral key pair (g, G) for performing the signature protocol. The CA 12c generates an integer $\bar{x}$ from the x coordinate of the public key G, and reduces it mod n, which serves as a first signature component r. A second signature component s is then computed from the relationship: $s = 1/g[h(m) + r \cdot k_{CA}]$ mod n; where m is the certificate information 42 of the certificate 40, and h( ) is a suitable hash function.

The certificate 40, which includes signature components r, s, is returned to the requestor, namely correspondent 12a in this example, who can verify the signature by computing a hash value e' of the certificate 40. Values $w = s^{-1}$ mod n, $u_1 = e' \cdot w$ mod and $u_2 = r \cdot w$ mod n are computed and combined to obtain a value representing a point value $X = u_1 P + u_2 Q_{CA}$.

The value X is checked to ensure it is not the point at infinity and the x coordinate $x_1$ of the value X is converted to an integer $\bar{x}$, reduced mod n and compared to the signature component r. If they are identical then the signature is verified.

The correspondent 12a may use the certificate 40 in communicating with other correspondents, 12b, who may also verify the signature, by using the components r,s and the public key $Q_{CA}$ of CA 12c. The public key $Q_A$ is then extracted from the certificate. The certificate 40 is compatible with the first specified format, e.g. conforming to the X.509 standard, even though it contains the supplementary information in the extension fields 62, 64.

If, however, the correspondents 12 prefer to use the second protocol, the certificate $IC_A$ and the information necessary for the correspondent 12a to generate the private key and corresponding to the public key are available in the extension fields on the certificate 40.

As shown in FIG. 5, the correspondent initially extracts the certificate $IC_A$ and the private key contribution data t from the certificate 40. Correspondent 12a computes a hash value $e_i$=h($IC_A$) and uses its static private key $k_A$ to compute a derived private key $k'_A$ as (t+$e_i·k_A$) mod n.

The private key $k'_A$ may then be used in conjunction with the ECQV certificate $IC_A$. Correspondent 12a can forward the implicit certificate $IC_A$ to a recipient, for example correspondent 12b. To obtain the public key $Q'_A$ corresponding to $k'_A$, and bound to the implicit certificate $IC_A$ the recipient 12b extracts $B_A$ from the certificate $IC_A$ and computes e"=hash($IC_A$) The public key $Q'_A$ is then computed as e"$B_A$+$Q'_{CA}$.

The use of the second protocol is therefore available to the requestor 12a if needed but the initial distribution of the certificate $IC_A$ to the requestor can be achieved using the certificate 40 and infrastructure associated with the first protocol.

In the event that the recipient of the certificate 40 does not need or wish to use the second protocol, the inclusion of the supplementary information will not affect the use of the certificate 40.

After recovery of the private key $k'_A$, it may be stored in the registers 26 of correspondent 12a for subsequent use with the certificate $IC_A$.

A number of variations in the generation of the certificate $IC_A$ are possible.

Figure 6:
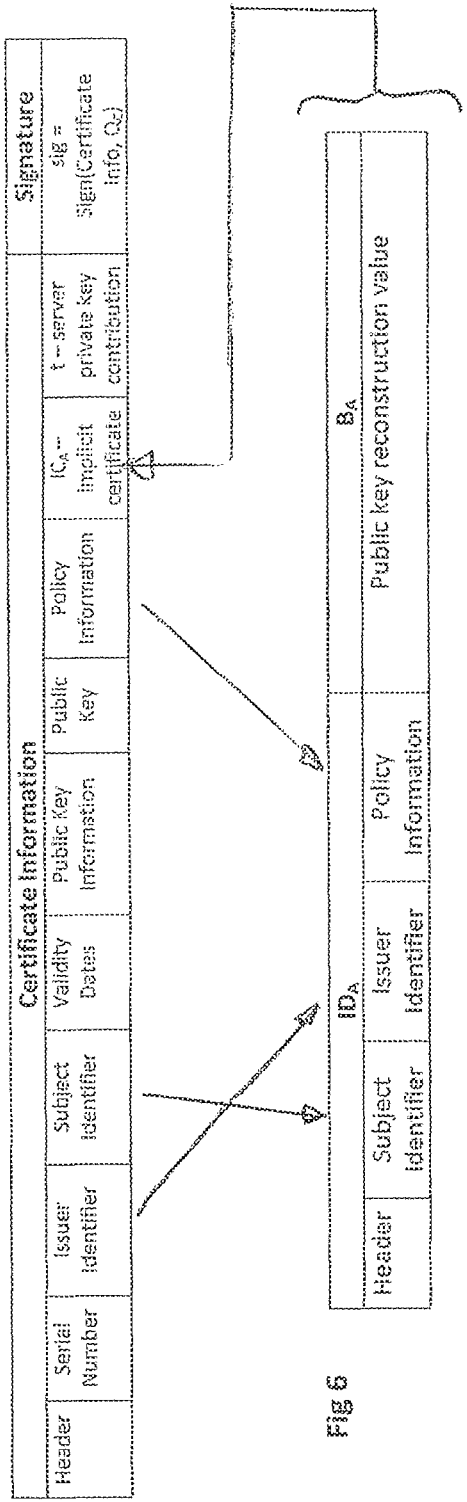
FIG. 6 is a schematic representation of an alternative method of creating a certificate as shown in FIG. 3.

As shown in FIG. 6, the identification information $ID_A$ used in the certificate $IC_A$ may be obtained by combining the certificate issuer and the certificate serial number.

Alternatively, the identification $ID_A$ may be the URL to an Online Certificate Status Protocol (OCSP) location, which may then be used as the unique subject identifier of the requestor, correspondent 12a. As a further alternative, the identification $ID_A$ may be obtained from the SubjectAltNameField of the certificate 40.

Figure 7:
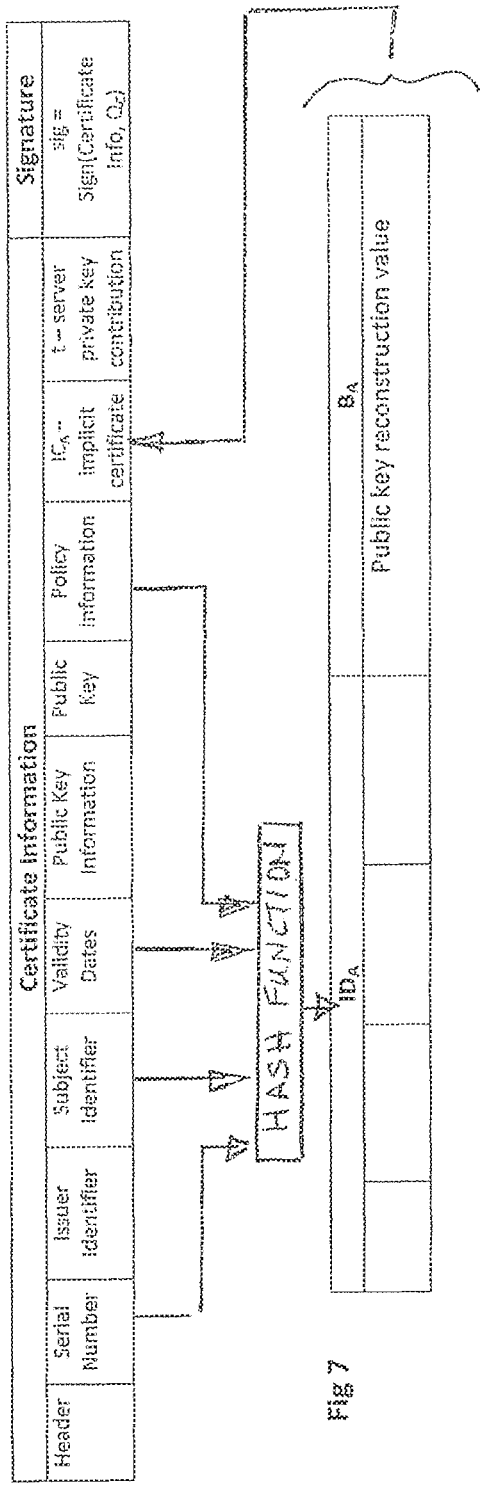
FIG. 7 is a representation of a further method of creating a certificate as shown in FIG. 3.

The identification information may also be obtained, as shown in FIG. 7, by combining selected fields from the certificate 40 and hashing the combination to provide the identification $ID_A$.

Although it may be desirable in some embodiments to use a pair of key pairs ($k_{CA}$, $Q_{CA}$) and ($k'_{CA}$, $Q'_{CA}$) at the CA, the CA may use only one key pair to issue both certificates.

Similarly, the requestor 12a may have two public keys, one for the first protocol and one for the second protocol, and the CA uses the appropriate one to generate the public key $B_A$. It can be appreciated that the same public key may be used in both protocols.

To further enhance the flexibility of provisioning the credentials, the generation of the certificate $IC_A$ may be delegated by the CA, 12c, to a second trusted CA, CA' indicated in ghosted outline in FIG. 1, who hosts the key pair $k'_{CA}Q'_{CA}$. This enables the second CA, CA' to prepare the certificate $IC_A$ and forward it to the first CA, 12c to include in the certificate 40 as the supplementary information.

It will be apparent that although the use of X.509 and ECQV protocols have been exemplified, the same techniques may be applied to other combinations of certificate protocols such as RSA-ECQV where the certificates accommodate the supplementary information. Similarly, the principles may also be used with other discrete log cryptosystems and to different versions or applications of the same underlying protocol.

The principles discussed above can also be used to facilitate a public/private key upgrade as illustrated in FIGS. 8A through 8E. It has been recognized that typically a CA 12c needs to wait years until all corresponding devices or entities adopt the root key of a new certificate type, e.g. through a new software release. Once this occurs, the CA 12c may then begin selling and promoting the new certificate type, which can also take years. As such, currently it is often a very lengthy time frame to deploy new certificate types. By using the formatting (e.g. the way it is structured) described above, the new certificate type can instead be distributed within the current certificates and if necessary be kept dormant until the root key for the new certificate format is obtained. In this way, the new certificate format can be used without delay once the root key is obtained, saving the time associated with certificate distribution. FIGS. 8A to 8E illustrate an example of such a certificate type upgrade process.

Figure 8A:
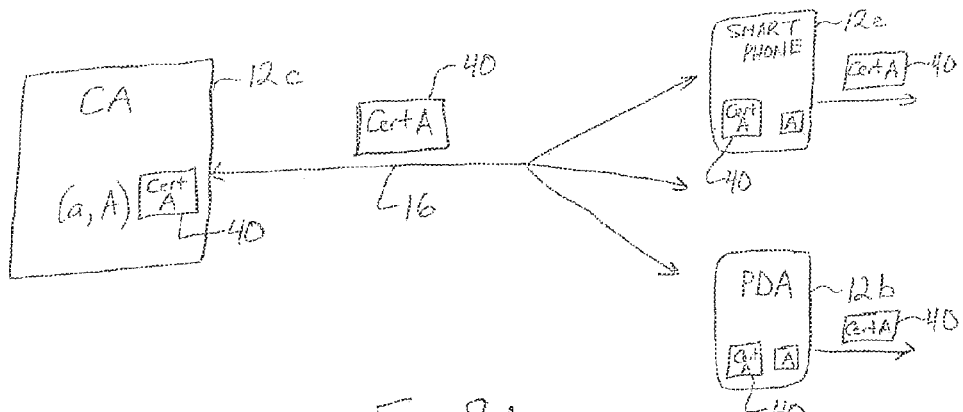
FIGS. 8A through 8E are schematic diagrams illustrating a certificate update process.
Figure 8B:
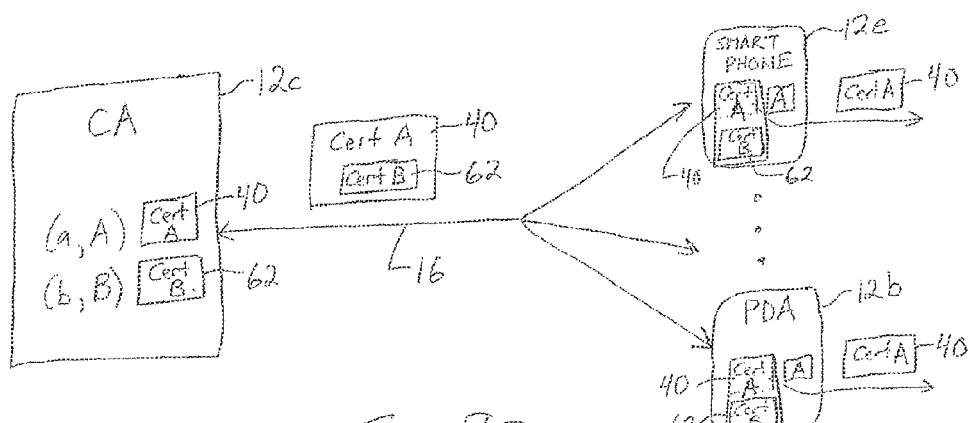

FIG. 8A illustrates the distribution of a current certificate (Cert A) 40, which has associated with it, a root key pair (a, A). In this example, a smart phone 12e and a PDA 12b are shown as the recipient devices for illustrative purposes only and it will be appreciated that any number and type of device may also participate. Over time, Cert A 40 may be deployed in large numbers with many servers (e.g. CA 12c) having Cert A 40 and many entities (e.g. browsers) having root key A. The smart phone 12e and PDA 12b shown in FIG. 8A thus have Cert A 40 and an associated root public key A available to them. At some later time, shown in FIG. 8B, the CA 12c begins to issue a new certificate type B (Cert B), which in this example is of the type referred to as numeral 62 in the above discussion. Cert B 62 has an associated root key pair (b, B). With previous systems, the CA 12c would not be able to begin using Cert B 62 until the root public key B has been deployed in many (or all) entities that would use Cert B 62. As discussed above, this can take many years. By using the formatting shown in FIGS. 3 and 4 described above, the CA 12c can instead begin without delay to distribute the new certificate type B embedded in Cert A 40. As shown in FIG. 8B, even though the smart phone 12e and PDA 12b do not yet have the root public key B, they can continue to use Cert A 40 and keep Cert B 62 dormant until it can be used.

Figure 8C:
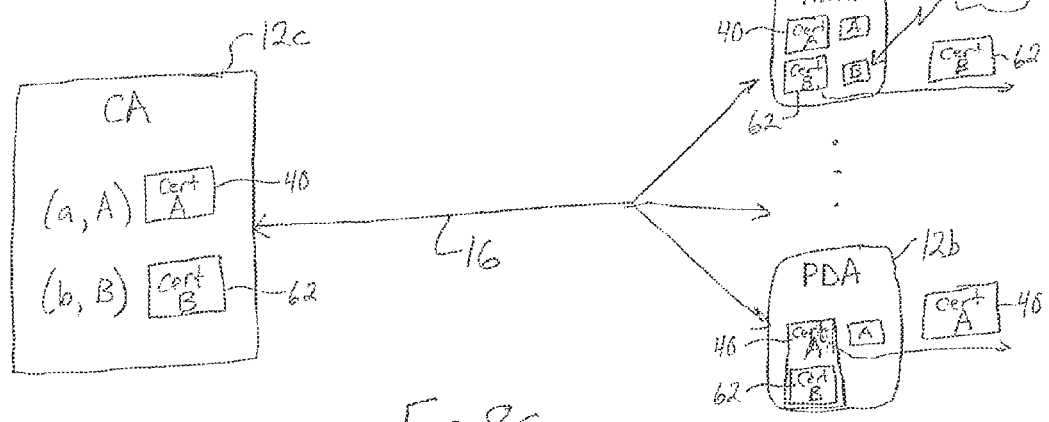
Figure 8D:
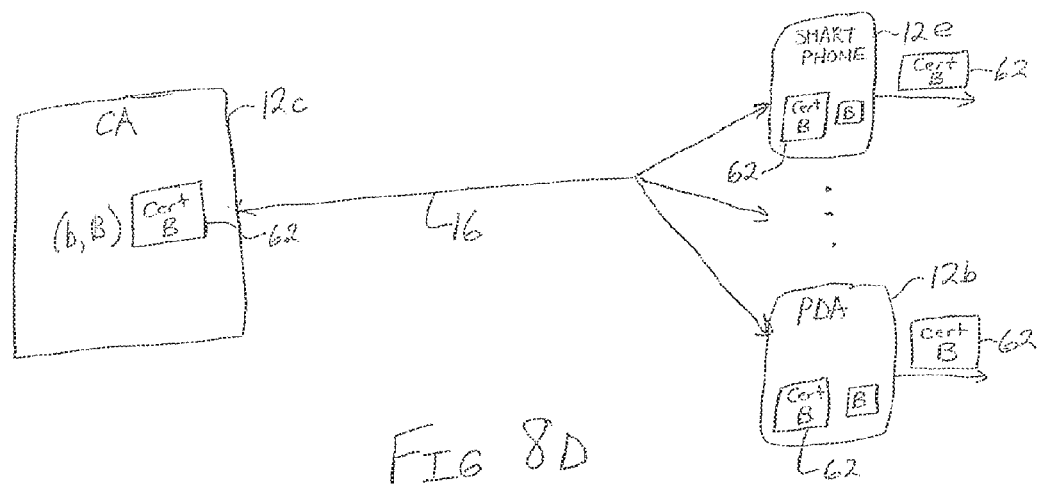
Figure 8E:
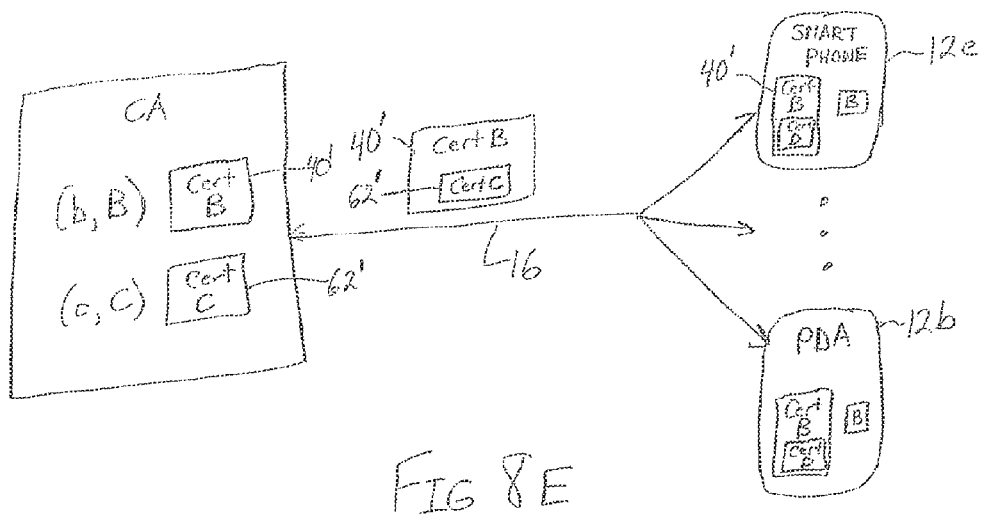

Turning now to FIG. 8C, the smart phone 12e in this example obtains the root public key B over the wireless network 16b and may then begin to use Cert B 62 while the PDA 12b can continue to use Cert A 40. Over time, the CA 12c may achieve significant penetration of the new certificate type by distributing it within Cert A 40. At some point, the CA 12c may then remove root key pair (a, A) without a significant impact on operations as illustrated in FIG. 8D and the overall system 10 would be upgraded to Cert B 62. In the future, shown in FIG. 8E, the CA 12c can use the same technique to upgrade current Cert B 40' to new Cert C 62' by embedding Cert C 62' in the same way. It can be appreciated that the suffix 0 is used to illustrate similar elements in a subsequent iteration. It will be appreciated that although the numerals 40 and 62 have been used in this example, the certificate update technique shown in FIGS. 8A to 8E should not be considered limited to using the certificate formatting shown in FIGS. 3 and 4. For example, this technique could be used to distribute 2048 RSA certificates (or ECC certificates) within a commonly used 1024 RSA certificate. The new 2048 RSA or ECC certificate may then lie dormant until the system 10 is provisioned to switch over to the new certificates.

Accordingly, the above provides a method of providing credentials, the method comprising: receiving a request to issue a first credential, wherein the first credential is to conform to a first specified format; preparing the first credential; incorporating supplementary information into the first credential to permit the requestor of the first credential to utilize a second credential that conforms to a second specified format, wherein the second specified format is different from the first specified format; and issuing the first credential in conformity with the first specified format. The above also provides a certificate issued by a certification authority to authenticate a public key of a correspondent, the certificate conforming to a first specified format and including the public key and supplementary information to permit a recipient of the certificate to utilize another certificate of a second different specified format.

The above also provides a method of obtaining credentials, the method comprising: receiving a first credential according to a first specified format; and extracting supplementary information from the first credential to utilize a second credential which conforms to a second specified format, wherein the second specified format is different from the first specified format.

The above also provides a server for providing certificates in a public key cryptographic system, the server comprising a cryptographic module configured to perform cryptographic operations, the cryptographic module generating a first certificate that conforms to a first specified format; obtaining supplementary information to permit utilization of a certificate of a second specified format which is different from the first specified format; inserting said supplementary information into the first certificate; and issuing the first certificate.

The above also provides a computer readable medium comprising computer executable instructions for providing credentials from a certificate authority, the computer readable medium including instructions for: receiving a request to issue a certificate, wherein the certificate is to conform to a first specified format; preparing the certificate including a public key of a requestor; incorporating supplementary information into the certificate to permit the requestor of the certificate to utilize a certificate in conformity with a second specified format, wherein the second specified format is different from the first specified format; and issuing the certificate in conformity with the first specified format.

The above also provides a computer readable medium comprising computer executable instructions for providing credentials, the computer readable medium including instructions for: receiving a certificate issued by a certificate authority according to a first specified format; and extracting supplementary information from the certificate to utilize a second certificate of a second specified format, wherein the second specified format is different from the first specified format.

Also provided is a computing device in a cryptographic system configured for obtaining credentials, the computing device comprising a cryptographic module configured for: receiving a first credential according to a first specified format; and extracting supplementary information from the first credential to utilize a second credential which conforms to a second specified format, wherein the second specified format is different from the first specified format.

Also provided is a system for providing credentials, the system comprising: a server; and at least one computing device communicably connectable to the server over a network; wherein: the server comprises a first cryptographic module to perform cryptographic operations, the first cryptographic module being configured for generating a first certificate conforming to a first specified format and obtaining supplementary information to permit utilization of a certificate of a second specified format which is different from the first specified format, and being configured for inserting the supplementary information into the first certificate and issuing the first certificate; and wherein: each the at least one computing device comprises a second cryptographic module to perform cryptographic operations, the second cryptographic module being configured for receiving the first certificate issued by a certificate authority according to the first specified format, and being configured for extracting supplementary information from the first certificate to utilize a second certificate of the second specified format, wherein the second specified format is different from the first specified format.

Although the above principles have been described with reference to certain specific embodiments, various modifications thereof will be apparent to those skilled in the art as outlined in the claims appended hereto. The entire disclosures of all references recited above are incorporated herein by reference.

The invention claimed is:

1. A method, by an information processing system, for providing credentials, the method comprising:
receiving, from a first correspondent that is external to the information processing system, a request to issue a first certificate securely identifying the first correspondent, wherein the first certificate is to conform to a first specified certificate format supported by the first correspondent, wherein the request is absent any certificates;
generating, based on receiving the request, the first certificate in the first specified credential format;
incorporating supplementary information comprising a second certificate into the first certificate, the second certificate conforming to a second specified credential format, the supplementary information permitting the first correspondent to subsequently extract the second certificate and communicate with a second correspondent using the second certificate according to the second specified credential format, wherein the second specified certificate format is different from the first specified credential format, the supplementary information further comprising information permitting a construction of a private key by the first correspondent to be used with the second certificate in the second specified credential format; and
issuing the first certificate to the first correspondent, the first certificate being issued in the first specified credential format and comprising the supplementary information in conformance with the second specified credential format, the first certificate providing the first correspondent with an option to communicate with the second correspondent utilizing one of the first certificate and the second certificate according to the first specified credential format and the second specified credential format, respectively.

2. The method according to claim 1, wherein the first specified credential format conforms to an ITU-T X.509 standard for certificate formatting, and wherein the supplementary information is incorporated into one or more extension fields provided in the first credential.

3. The method according to claim 1, wherein the second specified credential format is one of specified in and derived from an SECG SEC 4 standard for use with Elliptic Curve Qu-Vanstone (ECQV) protocol, wherein the certificate comprises an implicit certificate from which a public key is obtained, and wherein the supplementary information further comprises private key contribution data permitting generation of the private key for use with the implicit certificate.

4. The method according to claim 1, wherein the first certificate is signed using a first key, and wherein the supplementary information is generated using a second key.

5. A method of generating a certificate at a certification authority to authenticate a public key of a correspondent that is external to the certificate authority, the method comprising:
  generating the certificate and including the public key in the certificate such that the certificate conforms to a first specified credential format supported by the correspondent, the certificate permitting the correspondent to communicate with another correspondent according to the first specified credential format; and
  including supplementary information conforming to a second specified credential format in the certificate permitting the correspondent, after receiving the certificate, to subsequently extract the supplementary information and convert the certificate into another certificate of the second specified credential format, the second specified credential format being different from the first specified credential format, the supplementary information comprising information permitting construction of a private key by the correspondent to be used with the another certificate in accordance with the second specified credential format, the another certificate permitting the correspondent to communicate with the another correspondent according to the second specified credential format.

6. The method according to claim 5, further comprising including a signature of the certification authority in the certificate, wherein the signature is verifiable with a first public key of the certification authority.

7. The method according to claim 6, wherein the supplementary information includes the another certificate conforming to the second specified credential format.

8. The method according to claim 6, wherein a second public key of the certification authority is used to generate a public key from the another certificate.

9. A method of obtaining credentials performed by a processor of a requestor device, the method being performed by the requestor device and comprising:
  sending a request to a certification authority to issue a first certificate, wherein the request is absent any certificates, and wherein the certification authority is external to the requestor device;
  receiving, based on sending the request, the first certificate according to a first specified certificate format, the first certificate comprising supplementary information comprising a second certificate conforming to a second specified certificate format, wherein the second specified certificate format is different from the first specified certificate format;
  extracting the supplementary information from the first certificate;
  constructing, based on the extracting, a private key utilizing the supplementary information conforming to the second specified certificate format; and
  transmitting the second certificate and the private key to a recipient, the second certificate conforming to the second specified certificate format.

10. The method according to claim 9, wherein the first certificate that conforms to an ITU-T X.509 standard, and wherein the second specified certificate is one of specified in and derived from an SECG SEC 4standard for use with Elliptic Curve Qu-Vanstone (ECQV) protocol.

11. A server for providing certificates in a public key cryptographic system, the server comprising:
  a processor configured to perform cryptographic operations, the processor operable for:
  receiving a request from a first correspondent to issue a first certificate, wherein the request is absent any certificates;
  generating, based on receiving the request, the first certificate associated with the first correspondent conforming to a first specified credential format, where the first correspondent is external to the server;
  obtaining supplementary information, the supplementary information comprising a second certificate conforming to a second specified credential format, the second certificate permitting the first correspondent to communicate with a second correspondent according to the second specified credential format that is different from the first specified credential format, the supplementary information comprising further comprising information permitting a construction of a private key by the first correspondent to be used with the second certificate in the second specified credential format;
  inserting the supplementary information into the first certificate permitting the first correspondent to subsequently extract the second certificate and the information permitting construction of the private key; and
  issuing the first certificate to the first correspondent, the first certificate providing the first correspondent with an option to communicate with the second correspondent utilizing one of the first certificate and the second certificate according to the first specified credential format and the second specified credential format, respectively.

12. The server according to claim 11, further comprising a first key pair used to generate the first certificate, and a second key pair used to generate the supplementary information.

13. A non-transitory computer readable medium comprising instructions executable by a processor of an information processing system for providing credentials, the computer readable medium comprising instructions for:
  receiving, from a first correspondent that is external to the information processing system, a request to issue a first certificate securely identifying the first correspondent, wherein the first certificate is to conform to a first specified credential format supported by the first correspondent, wherein the request is absent any certificates;
  generating, based on receiving the request, the first certificate in the first specified credential format;
  incorporating supplementary information comprising a second certificate into the first certificate, the second certificate conforming to a second specified credential format, the supplementary information permitting the first correspondent to subsequently extract the second certificate and communicate with a second correspondent using the second certificate according to the second specified credential format, wherein the second specified credential format is different from the first specified credential format, the supplementary information further comprising information permitting a construction of a private key by the first correspondent to be used with the second certificate in the second specified credential format; and issuing the first credential to the first correspondent, the first certificate being issued in the first specified credential format and comprising the supplementary information in conformance with the second specified credential format, the first certificate providing the first correspondent with an option to communicate with the second correspondent utilizing one of the first certificate and the second certificate according to the first specified credential format and the second specified credential format, respectively.

14. A non-transitory computer readable medium comprising instructions executable by a processor of an information processing system for generating a certificate at a certification authority to authenticate a public key of a correspondent, the computer readable medium comprising instructions for:

generating the certificate and including the public key in the certificate, the certificate conforming to a first specified credential format supported by the correspondent, the certificate permitting the correspondent to communicate with another correspondent according to the first specified credential format; and including supplementary information conforming to a second specified credential format in the certificate permitting the correspondent, after receiving the certificate to subsequently extract the supplementary information and convert the certificate into another certificate of the second specified credential format, the second specified credential format being different from the first specified credential format, the supplementary information comprising information permitting construction of a private key by the correspondent to be used with the another certificate in accordance with the second specified credential format, the another certificate permitting the correspondent to communicate with the another correspondent according to the second specified credential format.

15. A non-transitory computer readable medium comprising instructions executable by a processor of a requestor device for obtaining credentials, the computer readable medium comprising instructions for:

sending a request to a certification authority to issue a first certificate, wherein the request is absent any certificates;

receiving, based on sending the request, the first certificate according to a first specified certificate format, the first certificate comprising supplementary information comprising a second certificate conforming to a second specified certificate format, wherein the second specified certificate format is different from the first specified certificate format;

extracting the supplementary information from the first certificate;

constructing, based on the extracting, a private key utilizing the supplementary information conforming to the second specified certificate format; and transmitting the second certificate and the private key to a recipient, the second certificate conforming to the second specified certificate format.

16. A computing device in a cryptographic system configured for obtaining credentials, the computing device comprising a processor configured for:

sending a request to a certification authority to issue a first certificate, wherein the request is absent any certificates, and wherein the certification authority is external to the computing device;

receiving, based on sending the request, the first certificate according to a first specified certificate format, the first certificate comprising supplementary information comprising a second certificate conforming to a second specified certificate format, wherein the second specified certificate format is different from the first specified certificate format;

extracting the supplementary information from the first certificate, the supplementary information conforming to a second specified certificate format;

constructing, based on the extracting, a private key utilizing the supplementary information conforming to the second specified certificate format; and transmitting the second certificate and the private key to a recipient, the second certificate conforming to the second specified certificate format.

17. The computing device according to claim 16, wherein the first certificate conforms to an ITU-T X.509 standard and wherein the second specified credential format is one of specified in and derived from an SECG SEC 4 standard for use with Elliptic Curve Qu-Vanstone (ECQV) protocol.

18. The computing device according to claim 16, wherein the computing device comprises any one or more of: a personal computer, a personal digital assistant, a server, a cell phone, and a smart phone.

* * * * *